Figure 1:
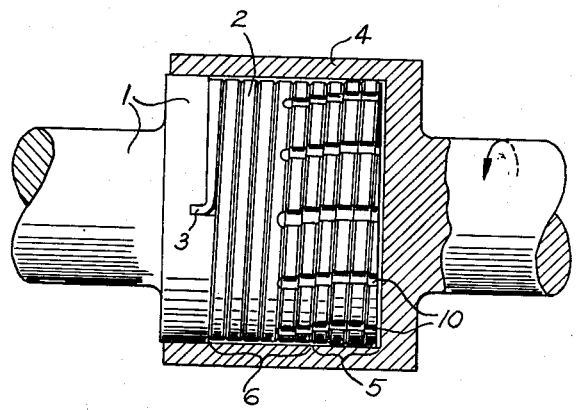

Feb. 9, 1954

S. F. GORSKE 2,668,347

METHOD OF MAKING CLUTCH SPRINGS

Filed Feb. 8, 1949

INVENTOR.
STANLEY F. GORSKE
BY
ATTORNEY

Patented Feb. 9, 1954

2,668,347

UNITED STATES PATENT OFFICE 2,668,347

METHOD OF MAKING CLUTCH SPRINGS

Stanley F. Gorske, Indianapolis, Ind., assignor, by mesne assignments, to The Marquette Metal Products Company, Cleveland, Ohio, a corporation of Ohio Application February 8, 1949, Serial No. 75,272

2 Claims. (Cl. 29—173)

The invention relates to an improvement in self-energizing helical torque-transmitting members of the type usually referred to as clutch springs and to a novel method of producing such members, thus indicating the principal objects.

The invention is illustrated herewith in connection with an expanding type clutch spring, the cooperating drum or drums of which has or have internal circular surfaces. Clutch springs of that type may be made self-energizing in the cooperating drum or drums by making all the coils of slightly oversize diameter, but then if the clutch has to overrun for substantial periods of time, undesirable and often quite destructive degrees of heat are generated. For self-energization, only a few free end and hence light duty coils of the spring have to be oversize relative to the coacting drum, enabling the principal load carrying coils to be undersize. When the spring is made from uniform section stock as is highly desirable for production purposes, a known practice is to slot the energizing end coils of the spring at intervals around the clutching periphery, thereby to make the energizing end coils relatively flexible and reduce their static unit pressure against the coacting drum relative to unslotted coils of the same diameter and section. These slotted coils have sometimes been expanded as by heat setting or straining on a mandrel relative to the main clutching coils which may be of the same diameter as the drum or less diameter than the drum in order that, during overrun, only the more flexible energizing coils have to be in heat-generating contact with the drum. That practice is quite expensive and it is difficult to secure uniformity of dimensions in quantity production.

Another practice in making self-energizing clutch springs is to attach to the free or torsionally unanchored end of a main or heavy duty portion of a spring, made, for example, from uniform section stock, one or more energizing or teaser coils of relatively small cross section and of (e. g.) oversize diameter relative to the main coils so that only the inherently more flexible coils have to be in contact with the drum during overrun in order to provide a self-energizing clutch spring. That practice is also quite expensive due to having to join two differently formed springs very securely together.

The present invention enables the making of relatively inexpensive, self-energizing clutch springs operable with low overrunning heat by taking advantage of natural capabilities of a coiled spring locally and controllably to change in diameter as certain internal stresses are removed from the coiled stock, thus indicating a further object of the invention.

Figure 2:
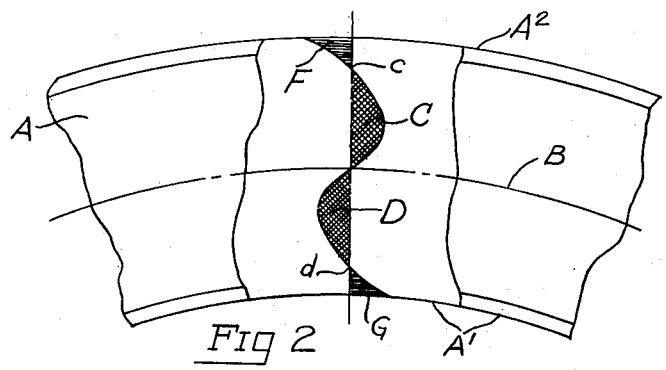
Figure 3:
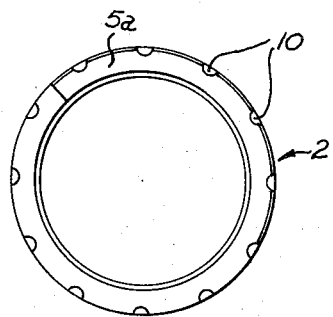
Figure 4:
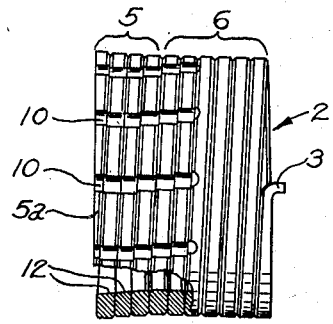

Other objects will become apparent from the following description:

In the drawing, Fig. 1 is a cross-sectional view of a spring clutch mechanism of one type; Fig. 2 is a stress diagram showing a typical internal stress pattern at one section of a clutch spring as usually formed; and Figs. 3 and 4 are end and side elevations of the clutch spring adapted for the type of clutch shown in Fig. 1, showing treatment according to the present invention.

The clutch according to Fig. 1 has a driving or driven helix member 1 against which the high load carrying end of the clutch spring 2 is nested and to which the spring may be anchored as by the toe portion 3 of the endmost load carrying coil. The complementary driven or driving member 4 is an internal drum aligned with the helix and embracing all the coils of the spring. A certain number of the rightward free end coils (group 5 for example) are the only coils necessary to be in friction contact with the drum under zero torque in order to make the clutch spring self-energizing. The group of coils 6 may thus, under zero torque, be entirely clear of the drum surface so that they are not subjected to heating during overrun.

As illustrated diagrammatically in Fig. 2, a typical helical clutch spring wound and thereby coiled from conventional approximately rectangular wire stock, a short section of which is shown at A in side elevation, to correlate the superposed stress diagram and inner and outer portions of the coil, the coil has a neutral axis as at B. The metal along the neutral axis has no internal or trapped stress. Outwardly therefrom the metal has gradually increasing and then diminishing tensile stress as represented by the double shaded area C. The metal in that area has not been strained beyond its elastic limit. Similar double shaded area D inwardly from the neutral axis toward the spring center represents the portion wherein the metal of the spring has not been strained beyond its elastic limit but is under compression. Outwardly relative to the spring center from the neutral-stress-indicating node c the metal is permanently distorted or strained beyond its elastic limit and under compression, the forces gradually increasing toward the outer periphery $A^2$ as indicated by shaded area F. A similar shaded area G indicates the opposite condition (metal strained beyond its elastic limit inwardly from neutral node d) but under increasing tension toward the inner periphery $A'$. The diagram is typical only, not representing an actual stress analysis of any particular spring.

Now if the spring is ground off on its outer periphery to a depth such that a substantial part of the permanently distorted compressed fiber portion represented by the shaded area F has been removed, the spring will grow in inside diameter to an extent proportional to the removal of its form-confining outer annular compression region as equilibrium of internal stresses is again established. Because in the spring treated as just described the tensile stresses generally in the region of area C balance the combination of stresses in the regions of areas D and G about a new neutral axis further progressive grinding or removal of metal of the outer periphery concentrically of the spring a certain distance into the area C will have an opposite effect (causing contraction) until the spring has its original internal diameter.

Conversely if only the area G is ground away the spring will first expand in external diameter by the disturbance of stress equilibrium and then contract as more metal is removed from the interior of the spring.

I make use of localized removal of the compressive stresses on the outer periphery of the spring so that it still has a circular form with circumferentially spaced clutching lands as by slotting of the end coils 5 of the spring as illustrated in Figs. 3 and 4 at 10 beginning with the free end or energizing coils 5a and slotting several coils preferably to gradient depths toward the load carrying end having the drive or anchor toe or lug 3. The illustrated spring is typical for use in the single pocket type clutch illustrated in Fig. 1. Such slotting 10 by reason of only locally disturbing the balanced stresses usually has (or may have, depending on the depth of the slots) very little effect on spring diameter, but it does greatly increase the flexibility of the slotted coils in proportion to the depth and width of the slots. If the slots are cut well into the area F, Fig. 2, the spring does expand producing exterior scallops. Now by removing some or all of the permanently distorted inner annular portion, area G, Fig. 2, of the spring, as by internal taper grinding or machining the same as at 12 Fig. 4, the end coils are progressively expanded to diameters which decrease toward the load carrying coils 6 in proportion to the diminishing depth of removal of interior metal. The flexibility of the coils 5 is increased in a gradient manner in proportion to the depth of cutting at 12.

Thus, as in Fig. 1, part or all of the coils 5 of an originally cylindrical clutch spring can be in initial contact with the cylindrical drum surface of pocket 4 under zero torque for insuring energization of all the spring coils into friction driving contact with the drum when torque is applied in the driving direction (e. g. per arrow on Fig. 1), assuming 4 to be the driving member. Then if the coils 6 are initially undersize or nearly so in the pocket they will have no appreciable overrunning drag, as member 1 overruns member 4. Assuming only a very few of the energizing coils are initially in interference fitting (i. e. radially strained) contact with the drum the overrunning friction is or can be practically negligible due to the marked flexibility hence low static radial-pressure-producing quality of the energizing coils.

In the case of a contracting-to-grip type of clutch spring the described treatment is reversed (not illustrated), the slotting or equivalent treatment being done on the inside surface of the free or energizing coils, the same end portion of the spring being ground or machined externally.

The depth of such internal slotting would not be critical because, as explained above, slotting at such intervals as illustrated does not materially alter the effective diameters of the slotted coils. The removal of stock from the outer peripheral portions of the coils would, however, have to be to such distance or distances into the area C, Fig. 2, that the inner diameters of one or more energizing coils would be reduced; thereby rendering those coils effective for energization against an external clutch drum while leaving the main load carrying coils larger than or the same size as the drum for low overrunning drag thereon. It will be apparent that the removal of metal from the outer periphery of such contracting type spring would usually produce a definite external step or shoulder between the energizing coils and load carrying coils so as to avoid expansion of coils intermediate of the ends of the spring to inner diameters larger than those of the load carrying coils. Such would result from removal of only such outer peripheral portions as represented by area F, Fig. 2.

I claim:

1. The method of treating helical clutch springs of generally cylindrical form wound from uniform section metal spring stock and having load carrying and energizing coil portions for contact with a clutch drum, each of the coils having internal stresses inwardly or outwardly from its peripheral surfaces which stresses maintain the stock in coiled form, comprising transversely slotting the drum-contacting peripheral surface portions of one or more of the energizing coils at intervals to form spaced clutching lands, and, radially opposite those lands, and on the opposite periphery from the slots, all around the slotted coil or coils, continuously removing peripheral portions of the coil or coils, to a limited extent such as will relieve the associated internal stresses in the spring stock and thereby cause the energizing coil or coils to be radially offset with reference to the load carrying coils, beyond the clutching surfaces of the load carrying coils in the clutching direction, when all the coils are relaxed.

2. The method of treating helical clutch springs of generally cylindrical form wound from uniform section metal spring stock and having load carrying and energizing coil portions for contact with an internal clutch drum, said coils having internal stresses which maintain the stock in coiled form, comprising transversely slotting the drum-contacting or outer peripheral surface portions of the energizing coils at intervals to form spaced clutching lands, and, radially opposite those lands all around the slotted coils, continuously removing internal peripheral portions of the coils to depths which decrease gradually from the endmost energizing coil toward the load carrying coils axially of the spring and to a limited extent such as will relieve internal stresses in the spring stock and thereby cause the energizing coils to become expanded progressively, with reference to the load carrying coils, when all the coils are relaxed.

STANLEY F. GORSKE.

References Cited in the file of this patent

UNITED STATES PATENTS

| Number | Name | Date |
|---|---|---|
| 1,935,147 | Drexler | Nov. 14, 1933 |
| 1,953,370 | Starkey | Apr. 3, 1934 |
| 2,030,333 | Starkey | Feb. 11, 1936 |